United States Patent [19]

Leoffler

[11] Patent Number: 4,514,226
[45] Date of Patent: Apr. 30, 1985

[54] MONOAZO PYRIDONE COLORANTS

[75] Inventor: Hermann Leoffler, Speyer, Fed. Rep. of Germany

[73] Assignee: BASF Aktiengesellschaft, Ludwigshafen, Fed. Rep. of Germany

[21] Appl. No.: 356,729

[22] Filed: Mar. 10, 1982

[30] Foreign Application Priority Data

Mar. 25, 1981 [DE] Fed. Rep. of Germany ....... 3111648

[51] Int. Cl.³ .................... C09B 29/42; C09D 11/02; C10J 1/24; C10M 1/40
[52] U.S. Cl. ........................................... 106/23; 44/59; 106/288 Q; 208/12; 252/364; 534/772
[58] Field of Search ..................... 260/156; 106/288 Q, 106/231; 44/59; 208/12; 252/364; 534/772

[56] References Cited

U.S. PATENT DOCUMENTS

| 3,487,066 | 12/1969 | Ritter et al. | 260/156 |
| 3,923,776 | 12/1975 | Gnad | 260/156 |
| 3,954,396 | 5/1976 | Ribka et al. | 260/156 X |
| 3,957,749 | 5/1976 | von Brachel et al. | 260/156 |
| 4,133,806 | 1/1979 | Gnad | 260/156 |
| 4,305,718 | 12/1981 | Loffler et al. | 260/156 |

FOREIGN PATENT DOCUMENTS

| 0018567 | 11/1980 | European Pat. Off. | 260/156 |
| 0061667 | 6/1982 | European Pat. Off. | 260/156 |
| 1917278 | 11/1970 | Fed. Rep. of Germany | 260/156 |
| 2216207 | 10/1972 | Fed. Rep. of Germany | 260/156 |
| 2252943 | 5/1974 | Fed. Rep. of Germany | 260/156 |
| 2438497 | 2/1976 | Fed. Rep. of Germany | 260/156 |
| 2153417 | 5/1973 | France | 260/156 |
| 2207213 | 6/1974 | France | 260/156 |
| 2281407 | 3/1976 | France | 260/156 |

Primary Examiner—Floyd D. Higel
Attorney, Agent, or Firm—Oblon, Fisher, Spivak, McClelland & Maier

[57]  ABSTRACT

A colorant of the formula:

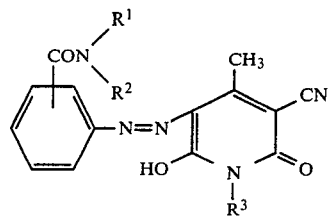

wherein $R_1$ $R_2$ and $R_3$ independently of one another are each $C_1$–$C_{18}$-alkyl, $C_1$–$C_{18}$-alkenyl, $C_4$–$C_9$-alkoxyalkyl, $C_4$–$C_9$-aryloxyalkyl, $C_9$–$C_{11}$-aralkoxyalkyl, $C_7$–$C_{11}$-aralkyl, $C_4$–$C_{13}$-acyloxyalkyl, $C_6$–$C_{14}$-alkoxycarbonyloxyalkyl, $C_6$–$C_{12}$-alkylaminocarbonyloxyalkyl or $C_4$–$C_9$-dialkylaminoalkyl, with the proviso that the sum of the carbon atoms of the radicals $R^1$ to $R^3$ is from 14 to 36 and the sum of the ether oxygen atoms in these radicals ranges from 0 to 2. The present dye compound is useful in the coloring of coating compositions, organic solvents and mineral oil products.

8 Claims, No Drawings

MONOAZO PYRIDONE COLORANTS

The present invention relates to a process for coloring coating compositions, organic solvents or mineral oil products, wherein the colorants used are compounds of the general formula I

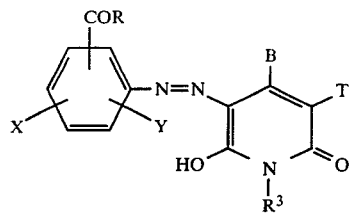

where X is hydrogen, chlorine, bromine, methyl or methoxy, Y is hydrogen, chlorine or bromine, B is hydrogen or $C_1$–$C_3$-alkyl, T is hydrogen, cyano, COR or $COR^4$, R is $OR^1$ or

where $R^1$ and $R^2$ may be identical or different, $R^1$, $R^2$ and $R^3$ independently of one another are each $C_1$–$C_{18}$-alkyl, $C_1$–$C_{18}$-alkenyl, $C_4$–$C_9$-alkoxyalkyl, $C_7$–$C_9$-aryloxyalkyl, $C_9$–$C_{11}$-aralkoxyalkyl, $C_7$–$C_{11}$-aralkyl, $C_4$–$C_{13}$-acyloxyalkyl, $C_6$–$C_{14}$-alkoxycarbonyloxyalkyl, $C_6$–$C_{12}$-alkylaminocarbonyloxyalkyl or $C_4$–$C_9$-dialkylaminoalkyl, $R^3$ may additionally be hydrogen, and $R^4$ is $C_1$–$C_3$-alkyl, with the proviso that the sum of the carbon atoms of radicals $R^1$, $R^2$ and $R^3$ is from 10 to 36 and the sum of the ether oxygens contained in these radicals is from 0 to 2.

The radicals B are hydrogen, ethyl or propyl, but preferably methyl.

Specific examples of the radicals $R^1$, $R^2$ and $R^3$ and $CH_3$, $C_2H_5$, $C_2H_4Cl$, n- and i-$C_3H_7$, $C_3H_6Cl$, $CH_2$—$CH$=$CH_2$, $\underset{CH_3}{CH}$—$CH_2$—$Cl$, n- and i-$C_4H_9$, $\underset{CH_3}{CH}$—$C_2H_5$, $C_4H_8Cl$, n- and i-$C_5H_{11}$, $CH_2C(CH_3)_3$, $C(CH_3)_2C_2H_5$, cyclopentyl, cyclohexyl, n-$C_6H_{13}$, $\underset{CH_3}{CH}$—n-$C_3H_7$, $\underset{H_3C}{CH}$—$\underset{CH_3}{CH}$—$CH_3$, $\underset{CH_3}{CHCH_2CH}$=$CH_2$, $\underset{CH_3}{CH_2CHC_2H_5}$, $CH_2$—$\underset{H_3C}{CH}$—$\underset{CH_3}{CH}$—$CH_3$, $C_2H_4N(C_2H_5)_2$, $C_3H_6N(CH_3)_2$, $CH_2$—$\underset{C_2H_5}{CH}$—$C_2H_5$, $\underset{CH_3}{CH_2CH}$—n-$C_3H_7$, n-$C_7H_{15}$, $CH[n-C_3H_7]_2$, $\underset{C_2H_5}{CH}$—n-$C_4H_9$, n-$C_8H_{17}$, $\underset{C_2H_5}{CH_2CH}$—n-$C_4H_9$, $C_3H_6N(C_2H_5)_2$, $C_2H_4N(C_2H_5)_2$, $CH(CH_3)C_3H_6N(C_2H_5)_2$, $CH$=$C_3H_6$—$\underset{CH_3}{CH}$—$\underset{CH_3}{CH}$—$CH_3$, n- and i-$C_9H_{19}$, n- and i-$C_{10}H_{21}$, n-$C_{12}H_{25}$, n- and i-$C_{13}H_{27}$, n-$C_{14}H_{29}$, n-$C_{15}H_{31}$, n-$C_{16}H_{33}$, n-$C_{17}H_{35}$, $C_{18}H_{37}$, $C_2H_4CH\underset{CH_3}{\overset{OCH_3}{\diagup}}$, $C_2H_4OCH_3$, $C_2H_4OC_2H_5$, $C_2H_4O$—n-$C_3H_7$, $C_2H_4O$—n-$C_4H_9$, $C_2H_4OC_6H_5$, $C_2H_4OCH_2C_6H_5$, $C_2H_4OC_2H_4OC_2H_5$, $C_2H_4OC_2H_4OC_4H_9$, $C_3H_6OCOCH_3$, $C_3H_6OCOC_2H_5$, $C_3H_6OCO$—n-$C_3H_7$, $C_3H_6O\underset{C_2H_5}{COCH}$—n-$C_4H_9$, $C_3H_6OCO_2C_2H_5$, $C_3H_6OCO_2$—n-$C_4H_9$, $C_3H_6OCO_2\underset{CH_3}{\overset{CH_3}{CH}}C_2H_5$, $C_3H_6OCO_2\underset{C_2H_5}{\overset{C_2H_5}{CH_2CH}}$—n-$C_4H_9$, $C_3H_6OCO_2$—cyclohexyl—$C(CH_3)_3$, $C_3H_6OCON(C_2H_5)_2$, $C_3H_6OCON(\underset{CH_3}{CHC_2H_5})_2$, $C_3H_6OC_2H_5$, $C_3H_6O$—n-$C_3H_7$, $C_3H_6O$—n-$C_4H_9$, $C_3H_6O\underset{C_2H_5}{CH_2CH}$—n-$C_4H_9$, $C_3H_6OC_6H_{13}$, $C_3H_6OCH_2C_6H_5$, $C_3H_6OC_6H_5$, $C_3H_6OC_2H_4OC_4H_9$, $C_3H_6OC_2H_4OCH_2C_6H_5$, $C_3H_6OC_2H_4OC_6H_5$, $C_3H_6OC_2H_4OC_6H_{11}$, $\underset{CH_3}{CHCH_2}OC_4H_9$, $\underset{CH_3}{CHCH_2}OC_6H_5$, $\underset{CH_3}{CHCH_2}OCH_2C_6H_5$, $\underset{CH_3}{CH_2CHOC_4H_9}$, $\underset{CH_3}{CH_2CHOC_6H_5}$, $\underset{CH_3}{CH_2CHOC_2H_4C_6H_5}$ and $C_3H_6O\underset{CH_3}{CHCH_2O}$—n-$C_4H_9$.

The radical $COR^4$ is preferably $CH_3CO$.
Compounds of the formula II

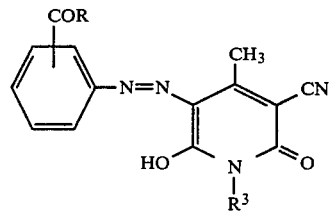

where R and $R^3$ have the meanings given are particularly important.

The radicals R and $R^3$ together preferably contain from 14 to 36 carbon atoms, in particular from 16 to 28 carbon atoms, and not more than one ether oxygen. Moreover, R preferably has the longer chain, and also preferably corresponds to the formula

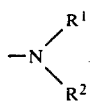

Specific examples of preferred radicals R are

CH₃, C₂H₅, n- and i-C₃H₇, n- and i-C₄H₉, n- and i-C₅H₁₁,

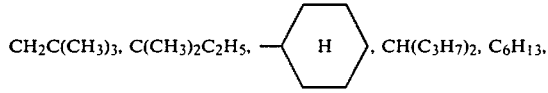

n-C₈H₁₇, CH₂CH—n-C₄H₉, i-C₉H₁₉, i-C₁₀H₂₁,
         |
         C₂H₅

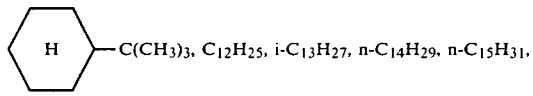

n-C₁₆H₃₃, n-C₁₇H₃₅, n-C₁₈H₃₇, C₂H₄OC₄H₉, C₂H₄OC₆H₅, C₂H₄OCH₂C₆H₅, C₂H₄OC₂H₄O—n-C₄H₉, C₂H₄OC₂H₄OC₆H₅, C₃H₆OC₄H₉ and C₃H₆OC₆H₅.

Preferred radicals R³ are

CH₃, C₂H₅, n- and i-C₃H₇, n- and i-C₄H₉, 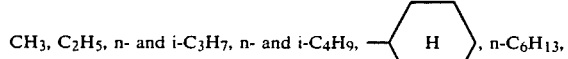, n-C₆H₁₃,

CH₂—CH—n-C₄H₉, n-C₈H₁₇, CH(C₂H₅)—n-C₄H₉,
     |
     C₂H₅

CH(CH₃)C₂H₄CH(CH₃)₂, CH(CH₃)C₃H₆CH(CH₃)₂, n-C₁₀H₂₁, n-C₁₃H₂₇, n-C₁₈H₃₇, C₃H₆OC₂H₅, C₃H₆OCH₂CH—n-C₄H₉
                                        |
                                        C₂H₅

C₃H₆O—n-C₁₃H₂₇, C₃H₆OCH₂C₆H₅ and C₃H₆OC₂H₄OC₆H₅.

The compounds of the formula I may be prepared by reacting a diazo compound of an amine of the formula

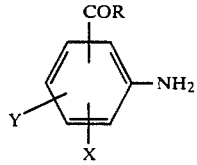

with a coupling component of the formula

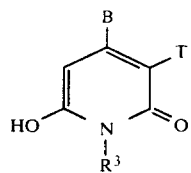

by a conventional method.

Of particular interest for the stated end use are mixtures of colorants of the formula II, which are prepared by combining appropriate amounts of the individual colorants, or by mixed coupling, the mixtures of the components being obtained by using mixtures of alcohols or of amines for their synthesis.

The invention further relates to the particularly useful novel colorants of the formula III

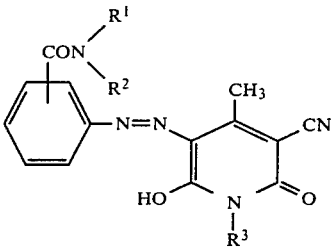

where the radicals R¹, R² and R³ together contain more than 14 carbon atoms.

Some of the compounds of the formula I are conventionally used for dyeing and printing polyester materials or polyester/cotton mixtures.

I have found that, surprisingly, the compounds of the formula I are very soluble in very diverse organic solvents and are thus suitable colorants for these, and also for surface coatings and mineral oil products. A feature to be singled out is the very good lightfastness, for metal-free compounds, in these media.

The colorants of the formula I, and in particular those of the formula III, are up to 10–15 times more soluble in protic polar and aprotic non-polar organic solvents than the comparable pyridone colorants suitable for this end use, so that a single colorant may be used for both media.

Moreover, by selecting the radicals R¹, R², R³ and R⁴, preferably R¹, R² and R³, the solubility of the colorant of the formula I may be adapted either specifically to the main end use or for universal use, ie. high solubility in many conventional media.

This requirement is met in particular by the colorants of the general formula III.

Particularly suitable solvents are toluene, xylenes, esters, ketones, glycols, glycol ethers and alcohols, and specific examples are ethyl acetate, butyl acetate, methoxyethyl acetate, acetone, methyl ethyl ketone, methyl glycol, methyl diglycol, butyl diglycol, ethanol, propanol, butanol, butyl phthalate and ethylhexyl phthalate.

In printing inks, the compounds of the formula I may replace the conventionally used pigments. This results in substantial advantages, since the finishing operations required when pigments are used, and the dispersing procedure, may be dispensed with. The fastnesses achievable are similar to those obtained using conventional pigments.

The Examples, in which parts and percentages are by weight, unless stated otherwise, illustrate the preparation and the use of the colorants.

EXAMPLE 1

34.6 parts of p-aminobenzoic acid N,N-bis-(2′-ethylhexyl)-amide are stirred with 85 parts by volume of 36% strength hydrochloric acid at 5°–10° C., and 30 parts by volume of an aqueous 3.33N sodium nitrite solution are added dropwise. The diazotization mixture is stirred for one hour at 10°-15° C. in the presence of excess nitrous acid, after which it is poured onto 500 parts of water, and amidosulfonic acid is added until excess diazotizing agent has been destroyed.

A solution of 24 parts of 1-n-hexyl-2-hydroxy-3-cyano-4-methylpyrid-6-one in 200 parts by volume of water at 50° C. and 6 parts by volume of 50% strength sodium hydroxide solution is run into the diazo mixture thus obtained, and stirring is continued at 25°-35° C. until the diazonium compound has been consumed. The greenish-yellow colorant which has crystallized through in the meantime is filtered off under suction, washed with water and dried at 50° C. under reduced pressure.

The resulting colorant of the formula

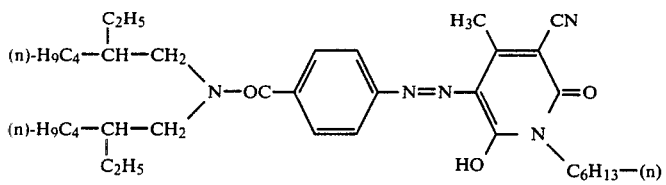

Mp. 82-83° C. (recrystallized from 80% strength ethanol)

dissolves very readily in organic solvents, eg. ethanol, ethyl acetate, methyl ethyl ketone, ethyl glycol, toluene and even universal spirit, to give a greenish-yellow coloration, and exhibits very good lightfastness in coating compositions.

If 0.6 part of this colorant is dissolved in a mixture of 15 parts of collodion cotton, 8 parts of n-butanol, 4 parts of ethylhexyl phthalate diester, 4 parts of dibutyl phthalate, 35 parts of ethyl glycol and 34 parts of toluene, and the solution thus obtained is used to print white paper, a greenish yellow print of good lightfastness is obtained after drying.

EXAMPLE 2

34.6 parts of anthranilic acid N,N-bis-(2'-ethylhexyl)-amide are dissoled in 200 parts of toluene, and the solution is cooled by the addition of 140 parts of ice. 30 parts by volume of 36% strength hydrochloric acid and 30 parts by volume of an aqueous 3.33N sodium nitrite solution are added, the latter a little at a time, to the thoroughly stirred mixture, and stirring is continued at 5°-10° C. for 30 minutes. Thereafter, excess nitrous acid is destroyed by the addition of a small amount of amidosulfonic acid, and 24 parts of finely powdered 1-n-hexyl-2-hydroxy-3-cyano-4-methylpyrid-6-one are then added. After coupling is complete, the lower, aqueous phase is separated off from the toluene solution containing the yellowish green colorant of the formula

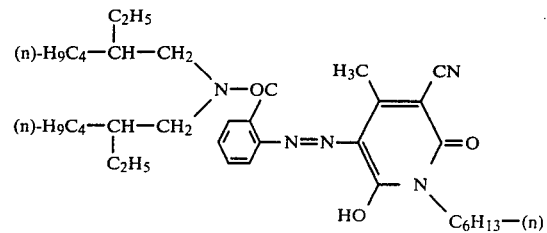

Mp. 76-78° C. (recrystallized from 90% strength CH₃OH)

The toluene solution is freed from any excess coupling component present by repeated thorough stirring with alkaline water, and is freed from residual water by distillation for a short time. In this operation, the solution may simultaneously be brought to the desired concentration of 300 g of colorant/liter.

When the colorant is mixed with 12,000,000 parts of fuel oil, the latter is colored yellow.

EXAMPLE 3

34.6 parts of anthranilic acid N,N-bis-(2'-ethylhexyl)-amide are coupled to 21 parts of 1-n-butyl-2-hydroxy-3-cyano-4-methylpyrid-6-one by the procedure described in Example 1.

5 parts of the resulting colorant of the formula

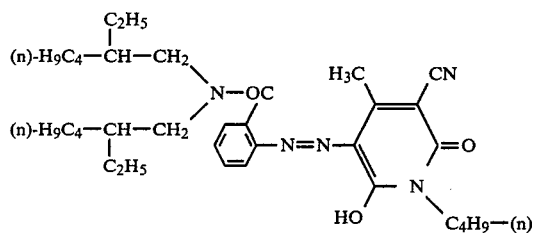

Mp. 77-78° C. (recrystallized from 90% strength CH₃OH)

are dissolved in a mixture of 10 parts of a styrene-/maleic acid ester resin as the binder, 65 parts of ethanol, 10 parts of propanol and 10 parts of ethyl glycol. A yellow alcohol-based ink suitable for writing implements is thus obtained.

EXAMPLE 4

27.7 parts of i-decyl 4-aminobenzoate are combined with 23.5 parts of 1-n-hexyl-2-hydroxy-3-cyano-4-methylpyrid-6-one by the procedure described in Example 1, and a greenish yellow colorant of the formula

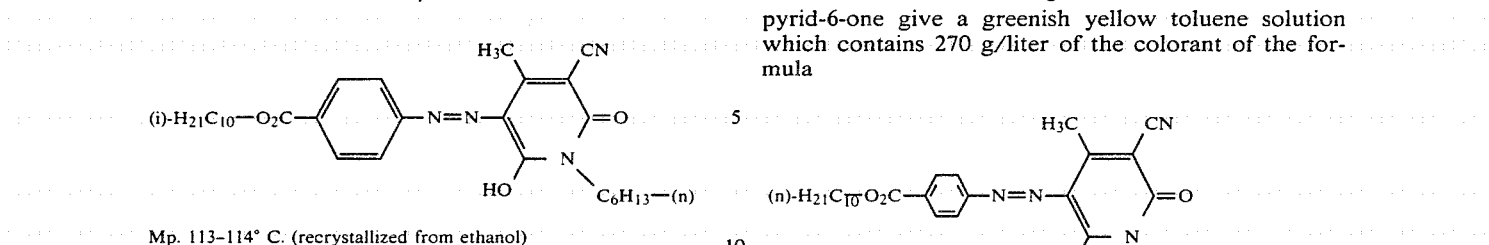

Mp. 113–114° C. (recrystallized from ethanol)

is obtained.

6 parts of this colorant are dissolved in a mixture of 37 parts of ethyl acetate, 37 parts of methyl ethyl ketone and 20 parts of a vinyl chloride/vinyl acetate copolymer as the binder. The surface coating obtained gives greenish yellow hues on aluminum foil.

EXAMPLE 5

Using a procedure similar to that described in Example 2, 27.7 parts of n-decyl p-aminobenzoate and 26.5 parts of 1-(2'-ethylhexyl)-2-hydroxy-3-cyano-4-methylpyrid-6-one give a greenish yellow toluene solution which contains 270 g/liter of the colorant of the formula

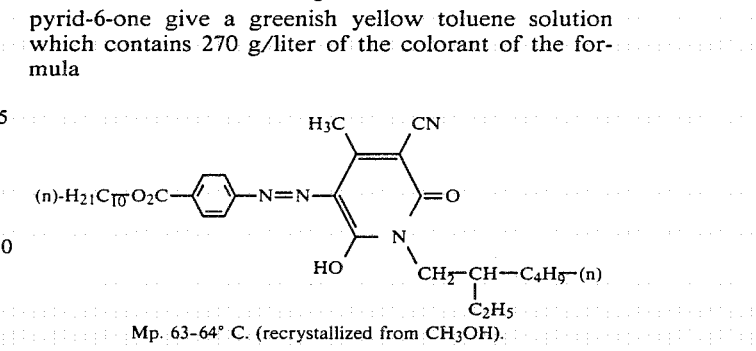

Mp. 63–64° C. (recrystallized from $CH_3OH$).

21 parts of this concentrated solution are dissolved in a mixture of 69 parts of toluene and 10 parts of a styrene/maleate ester resin. The mixture thus obtained is suitable as an ink for felt-tip pens.

The colorants given in the table below, and identified therein by their substituents, may be prepared and used by methods similar to those described.

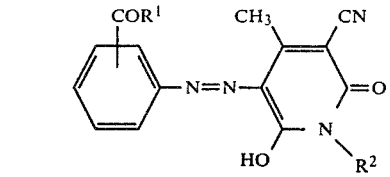

| Example | $R^1$ | $R^2$ | Color of solution |
|---|---|---|---|
| 6 | p-N(CH$_2$—CH(C$_2$H$_5$)—C$_4$H$_9$)$_2$ | n-C$_4$H$_9$ | greenish yellow |
| 7 | o-N(CH$_2$—CH(C$_2$H$_5$)—C$_4$H$_9$)$_2$ | C$_6$H$_{13}$ | " |
| 8 | " | CH$_3$ | " |
| 9 | " | —⟨C$_6$H$_{11}$⟩ | " |
| 10 | p-N(CH$_2$—CH(C$_2$H$_5$)—C$_4$H$_9$)$_2$ | " | " |
| 11 | " | CH$_2$—CH(C$_2$H$_5$)—C$_4$H$_9$ | " |
| 12 | o-N(CH$_2$—CH(C$_2$H$_5$)—C$_4$H$_9$)$_2$ | " | " |
| 13 | p-N(C$_4$H$_9$)$_2$ | " | " |
| 14 | o-N(C$_4$H$_9$)$_2$ | " | " |
| 15 | " | n-C$_6$H$_{13}$ | " |
| 16 | p-N(C$_4$H$_9$)$_2$ | " | " |
| 17 | o-N(C$_4$H$_9$)$_2$ | n-C$_{12}$H$_{25}$ | " |
| 18 | " | C$_3$H$_6$—O—C$_2$H$_4$—O—⟨Ph⟩ | " |
| 19 | o-N(CH(CH$_3$)—C$_2$H$_5$)$_2$ | CH$_2$—CH(C$_2$H$_5$)—C$_4$H$_9$ | " |
| 20 | p-N(CH(CH$_3$)—C$_2$H$_5$)$_2$ | " | " |

-continued

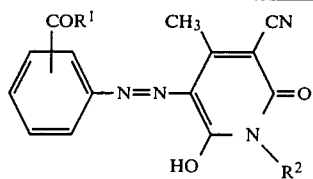

| Example | R¹ | R² | Color of solution |
|---|---|---|---|
| 21 | p-N(H)(C₂H₅) (cyclohexyl) | " | " |
| 22 | p-N(n-C₄H₉)(C₂H₅) | " | " |
| 23 | p-N(n-C₃H₆)(CH(CH₃)—C₂H₅) | " | " |
| 24 | m-N(n-C₃H₆)(CH(CH₃)—C₂H₅) | " | " |
| 25 | p-O—i-C₁₀—H₂₁ | n-C₄H₉ | " |
| 26 | " | CH₂—CH(C₂H₅)—n-C₄H₉ | " |
| 27 | o-O—i-C₁₀—H₂₁ | " | " |
| 28 | p-O—i-C₁₀—H₂₁ | C₃H₆—O—CH₂—C₆H₅ | " |
| 29 | o-O—i-C₁₀—H₂₁ | " | " |
| 30 | " | C₃H₆—O—C₂H₄—O—C₆H₅ | " |
| 31 | m-O—i-C₁₀—H₂₁ | CH₂—CH(C₂H₅)—n-C₄H₉ | " |
| 32 | p-O—i-C₁₃H₂₇ | " | " |
| 33 | o-O—i-C₁₃—H₂₇ | " | " |
| 34 | p-O—i-C₁₃H₂₇ | C₃H₆—O—CH₂—C₆H₅ | " |
| 35 | " | C₃H₆—O—C₂H₄—O—C₆H₅ | " |
| 36 | p-CH₂—CH(C₂H₅)—n-C₄H₉ | CH₂—CH(C₂H₅)—n-C₄H₉ | |

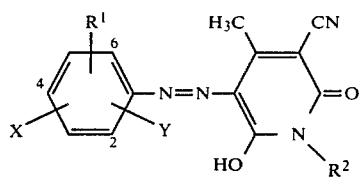

| Example | $R^1$ | $R^2$ | X | Y | Color of solution |
|---|---|---|---|---|---|
| 37 | p-N(C$_4$H$_9$)$_2$ | C$_2$H$_5$ / CH$_2$—CH—n-C$_4$H$_9$ | 2-Br | 6-Br | |
| 38 | o-N(C$_4$H$_9$)$_2$ | " | H | " | " |
| 39 | " | " | 4-Br | " | " |
| 40 | p-O—i-C$_{10}$H$_{21}$ | " | 2-Br | " | " |
| 41 | o-O—i-C$_{10}$H$_{21}$ | " | H | " | |

I claim:

1. A colorant of the formula:

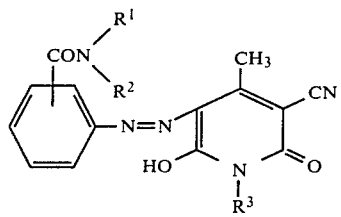

wherein $R_1$ $R_2$ and $R_3$ independently of one another are each $C_1$–$C_{18}$-alkyl, $C_1$–$C_{18}$-alkenyl, $C_4$–$C_9$-alkoxyalkyl, $C_4$–$C_9$-aryloxyalkyl, $C_9$–$C_{11}$-aralkoxyalkyl, $C_7$–$C_{11}$-aralkyl, $C_4$–$C_{13}$-acyloxyalkyl, $C_6$–$C_{14}$-alkoxycarbonyloxyalkyl, $C_6$–$C_{12}$-alkylaminocarbonyloxyalkyl or $C_4$–$C_9$-dialkylaminoalkyl, with the proviso that the sum of the carbon atoms of the radicals $R^1$ to $R^3$ is from 14 to 36 and the sum of the ether oxygen atoms in these radicals ranges from 0 to 2.

2. The colorant of claim 1, wherein the sum of the carbon atoms in the radicals $R^1$ to $R^3$ ranges from 16 to 28.

3. The colorant of claim 1, wherein radicals $R^1$ and $R^2$ are longe chained radicals than radical $R^3$.

4. The colorant of claim 1, wherein the sum of the ether oxygen atoms in radicals $R^1$-$R^3$ is 0.

5. The colorant of claim 1, wherein the radicals $R^1$ and $R^2$ are each alkyl of 4 to 13 carbon atoms.

6. The colorant of claim 5, wherein the carbon atom content of said $R^1$ and $R^2$ radicals ranges from 4 to 8 carbon atoms.

7. The colorant of claim 1, wherein radical $R^3$ is an alkyl group of 1 to 13 carbon atoms.

8. A method of coloring a coating composition, an organic solvent or a mineral oil product, comprising: dissolving the compound of claim 1 in said coating composition, said organic solvent or said mineral oil product.

* * * * *